(12) United States Patent
Saxena et al.

(10) Patent No.: US 6,368,104 B1
(45) Date of Patent: Apr. 9, 2002

(54) ROTARY HEARTH FURNACE

(75) Inventors: Neeraj Saxena, Murray Hill; Rajesh Maruti Wajge, Chatham, both of NJ (US); Kenneth W. Grieshaber, Bethlehem, PA (US)

(73) Assignee: The BOC Group, Inc., New Providence, NJ (US)

( * ) Notice: Subject to any disclaimer, the term of this patent is extended or adjusted under 35 U.S.C. 154(b) by 0 days.

(21) Appl. No.: 09/405,623

(22) Filed: Sep. 24, 1999

(51) Int. Cl.⁷ .................................................. F27B 9/16
(52) U.S. Cl. ....................................... 432/138; 432/139
(58) Field of Search ............................... 432/124, 138, 432/139, 195; 266/173; 110/225

(56) References Cited

U.S. PATENT DOCUMENTS

| | | | |
|---|---|---|---|
| 3,836,320 A | * 9/1974 | Hemsath et al. | 432/138 |
| 4,906,183 A | * 3/1990 | Kyffin et al. | 432/138 |
| 5,730,775 A | 3/1998 | Meissner et al. | |
| 5,865,875 A | 2/1999 | Rinker et al. | |
| 5,899,688 A | * 5/1999 | Fontana | 432/139 |
| 5,989,019 A | * 11/1999 | Nishimura et al. | 432/138 |

FOREIGN PATENT DOCUMENTS

EP 0885 972 A1 12/1998

\* cited by examiner

*Primary Examiner*—Denise L. Ferensic
*Assistant Examiner*—Gregory A. Wilson
(74) *Attorney, Agent, or Firm*—Salvatore P. Pace

(57) ABSTRACT

An improved rotary hearth furnace having a cylindrical enclosure containing a radially moving belt for transporting pellets containing metal oxide and carbon is disclosed. One or more oxy-fuel burners preferably having a flat flame shape are positioned so as to provide a mixture of fuel and oxidant to the pellets countercurrent to the direction of the pellets. The oxy-fuel burners are operated so as to provide a pre-determined quantity of oxygen in addition to that necessary for combustion so that the additional oxygen oxidizes the carbon monoxide and hydrogen present in the hot combustion gases. Oxygen injectors may also be used to introduce additional oxygen into the furnace. The additional oxygen is strategically injected into the furnace based on thermodynamic modeling of the furnace so that a substantial majority of the fuel is introduced in a reducing zone so that the reducing zone has a fuel-rich atmosphere while the oxidant is primarily introduced in the heating zone so that the heating zone has a fuel-lean atmosphere.

16 Claims, 2 Drawing Sheets

ROTARY HEARTH FURNACE

BACKGROUND OF THE INVENTION

The present invention relates to a rotary hearth furnace (RHF) in which premixed pellets of metal oxides and carbon are transported on a radially moving belt during which time the pellets are exposed to hot combustion gases in a countercurrent manner resulting in the metal oxide being reduced to sponge metal. More particularly, the present invention relates to such a rotary hearth furnace in which oxygen is injected into the furnace such that the carbon monoxide and hydrogen present in the combustion gases are oxidized to generate additional heat for heating the pellets. The injection of the oxygen is accomplished by using an oxy-fuel burner having a flat, wide, flame to increase heat transfer to the pellets. The oxygen is injected at strategic locations within the furnace to combust the exhaust gases and still allow the reduction of the metal oxide.

Doughnut shaped rotary hearth furnaces used to reduce metal oxides are well known in the art. In a traditional rotary hearth furnace heat is provided by air fuel burners placed in the furnace hearth aimed at the top of the pellet bed. The radial belt inside the furnace moves around the circumference of the furnace at a rate sufficient to enable the pellets to reside in the furnace for approximately one complete revolution. Combustion gases are exhausted through a top vent near where the pellets are introduced. Combustion gases in a rotary hearth furnace are often generated from other sources such as the offgas of a smelter.

It is important that the combustion takes place in the most thermally efficient manner in order to conserve both fuel and oxidant as well as in a manner to reduce harmful emissions. It is also important that the furnace atmosphere is sufficient to reduce the metal oxide. However, in conventional rotary hearth furnaces such as described above, there is a loss of efficiency and unwanted emissions due to the partial products of combustion being exhausted out of the furnace. As will be discussed, the present invention provides improvement to rotary hearth furnaces such as those discussed above by utilizing additional oxygen to oxidize certain post-combustion gases which provides additional heat; and to reduce carbon monoxide in the exhaust, while maintaining an appropriate reducing environment at all locations in the furnace so that accelerated oxide reduction can occur.

SUMMARY OF THE INVENTION

The present invention pertains to a rotary hearth furnace comprising a cylindrical chamber having substantially parallel cylindrical sidewalls and a top and bottom forming an enclosure to contain a belt and metal oxide/carbon pellets. One or more oxy-fuel burners are positioned to fire inside the enclosure to inject a stream of hot combustion gases to the pellets which flow in a direction counter to the direction of the pellets.

The oxy-fuel burners are preferably flat-flame oxy-fuel burners such as those described in U.S. Pat. Nos. 5,299,929 and 5,360,171 assigned to the BOC Group, Inc. The amount and distribution of oxygen injected into the furnace is dictated by thermodynamic modeling of the furnace with the objective of minimizing the amount of fuel required per ton of metal formed, subject to heat transfer constraints. The burners are optimally placed so that a majority of the oxygen is injected in the first section (or heating zone) of the furnace to create an oxidant rich atmosphere with the remainder of the oxygen injected in the second section (or reducing zone) of the furnace wherein a fuel rich zone is created.

The hot combustion gases should preferably comprise an amount of oxygen in excess of the amount necessary for stoichiometric combustion. In such manner, the energy can be extracted from the carbon monoxide and hydrogen present in the hot combustion gases which would normally be exhausted from the hearth. The use of this method can effect up to a 55% reduction in the amount of natural gas consumed per unit metal output.

A further benefit of the present invention is the decrease in the size of the waste gas handling system due to a decrease in the amount of nitrogen in the waste gas stream.

The present invention can be used in existing rotary hearth furnaces or can be used to design more efficient new furnaces.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
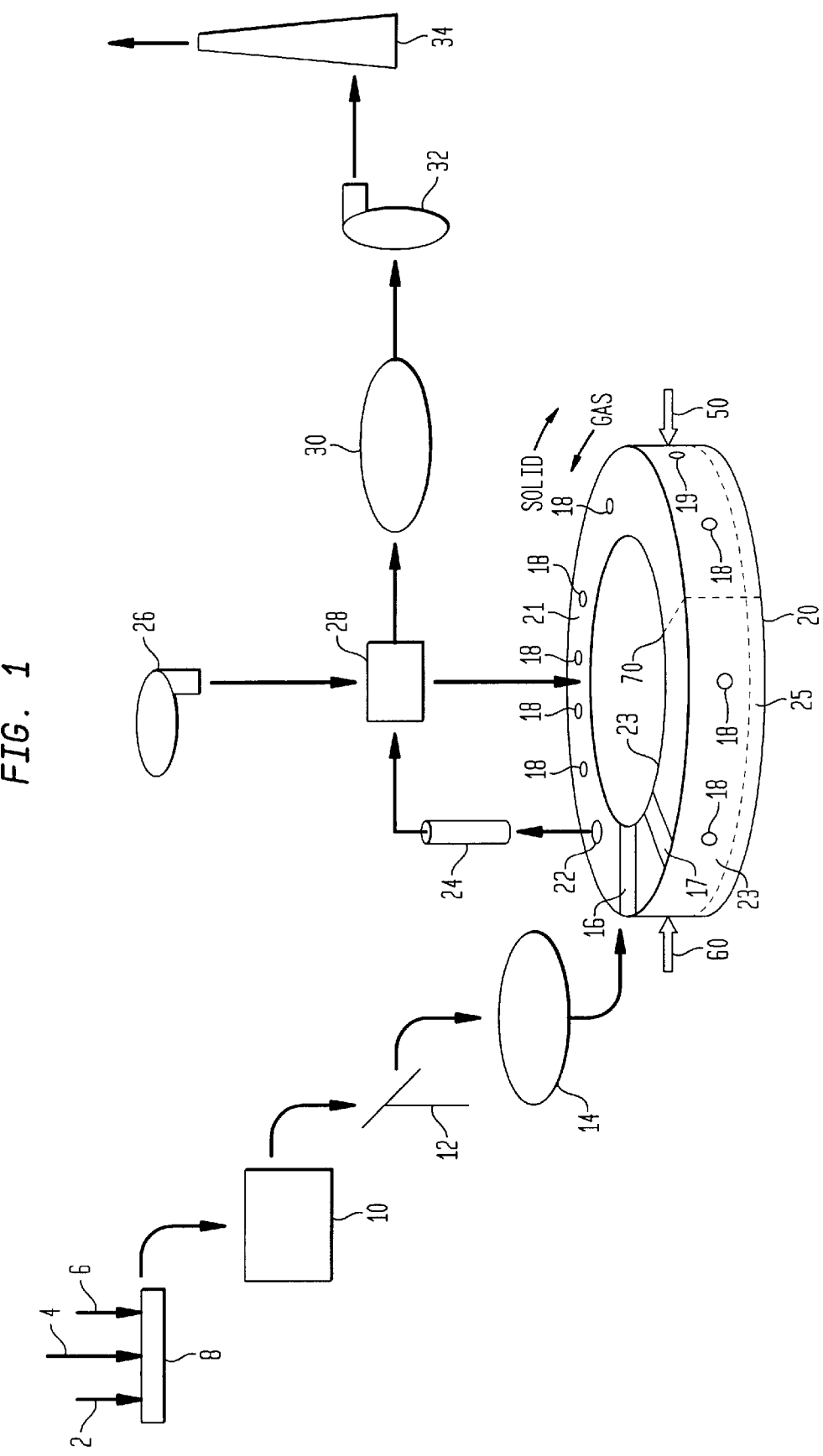
FIG. 1 is a top elevational schematic view of a furnace in accordance with the present invention.

With reference to FIG. 1, a rotary hearth furnace 20 in accordance with present invention is illustrated. Furnace 1 has cylindrical sidewalls 23 and substantially parallel top 21 and bottom (not shown) that define an enclosure. Furnace 20 has a pellet inlet 16, a pellet outlet 17 and a top exhaust gas outlet 22. An internal radial belt 25 transports pellets in a clockwise direction around the axis of the furnace 20. The pellets are comprised of metal oxide (ore) 2, for example, iron oxide, and carbon 4, for example, coal, which is transported in transporting means 8 along with a binder 6 to a mixer 10 which creates a substantially homogenous mixture of the metal oxide 2, carbon 4 and binder 6. The mixture is then put into a pelletizer 12 which generates pellets of the homogenous mixture in a well-known manner. The pellets are then dried in a dryer 14 prior to being placed in the furnace 20 through inlet 16.

As the pellets are transported in a clockwise direction around the axis of furnace 20 on radial belt 25 one or more burners 18 generate hot combustion gases so as to create a stream of hot combustion gases in a direction counter to the flow of pellets, i.e., counterclockwise in the current example. Oxy-fuel burners such as those described in U.S. Pat. No. 5,299,929 are preferred in that the flat flame produced by such burners provides an even distribution of the hot combustion gases across the radius of the radial belt 25.

At outlet 22 the gas stream is exhausted. The gas stream enters heat exchanger 28 into which air is blown by fan 26 in order to recover some of the heat in the exhaust gas which is then returned to furnace 20. After exiting heat exchanger 28 the gas stream enters a scrubber 30 being pulled by fan 32 into exhaust stack 34.

The placement and operation of the oxy-fuel burners 18 and the operation of the burners 18 are critical factors to the present invention. By controlling the placement of the injection of oxygen in excess of the amount necessary for combustion, i.e., the stoiciometric ratio, proper post combustion will occur which will decrease the total amount of fuel required for processing a particular quantity of metal oxide. A first section or heating zone 50 of the rotary hearth furnace near the inlet 16 can be distinguished from a second section or reducing zone 60 near the outlet 22. In the first section there is a transfer of heat predominantly from gas to pellets without any significant chemical reactions in the solid phase. As the pellets advance the first section or heating zone ends and the second section or reducing zone begins where the reaction rates in solid phase become significant due to the higher temperatures at or above approximately 1000° C. This is where the reduction of ore occurs. Gas phase reactions are normally fast and can be assumed to occur in both sections. Optimal burner placement should result in a substantial majority of the hot combustion gases being injected into the first section or heating zone with the remainder being injected into the second section or reducing zone. Although the second section is referred to as the reducing zone heating of the ore pellets continues to occur. The transition line 70 from the heating zone to the reducing zone occurs where the pellets reach a sufficiently high temperature for reduction to begin ($T_p$). The $T_p$ for a specific pellet depends on the composition of the pellet, including the type of metal oxide. The range of $T_p$ for commonly reduced metal oxide pellets ranges from about 7000° C. to about 1000° C.

Figure 2:
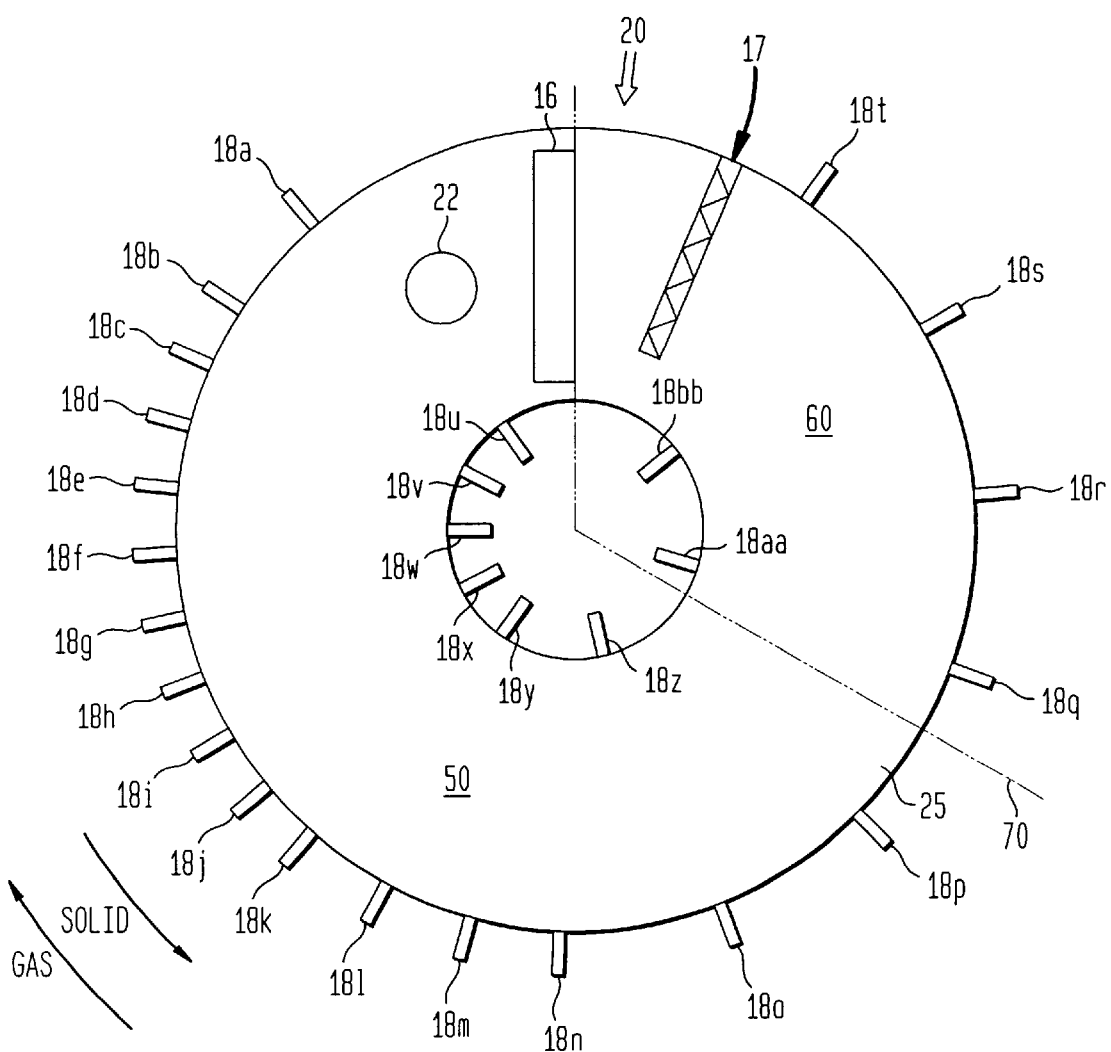
FIG. 2 is a top plan view of a furnace in accordance with the present invention.

The amount of oxygen introduced into the furnace through the burner is a function of the position of the burner around the inner or outer circumference of the furnace. Referring to FIG. 2 a plurality of burners 18a–18t around the periphery of furnace 20 inject oxygen (as air or substantially pure oxygen or some combination thereof) into furnace 20. Burners 18u–18bb around the inner circumference of furnace 20 also inject oxygen into furnace 20. Line 70 represents the approximate border between heating zone 50 and reducing zone 60 for a particular metal oxide pellet. Burners 18a–18p and 18u–18z inject fuel and/or oxygen into heating zone 50 and are operated so that the ratio of oxygen to fuel is between 2:1 and 5:1 thereby creating a fuel lean atmosphere in the heating zone. Burners 18q–18t and 18aa–18bb inject fuel and/or oxygen into the reducing zone 60 and are operated so that the ratio of oxygen to fuel is between 1:1 and 1.8:1 thereby creating a fuel rich atmosphere in the reducing zone. Oxygen injectors may also be employed to inject additional oxygen into the heating zone and/or the reducing zone. Such oxygen injectors are well known in the art and can be used to inject air, substantially pure oxygen or some combination thereof. In the present invention such oxygen injectors would be used to inject oxygen containing gas into the heating zone to increase the molar ratio of oxygen to fuel up to approximately 25:1 in that zone or to inject oxygen containing gas into the reducing zone to increase the ratio of oxygen to fuel up to approximately 5:1 in the reducing zone.

The amount of fuel introduced into the heating zone 50 should be less than 30% of the total fuel necessary per ton of metal produced and, preferably, less than 25% of the total. The remainder of the fuel is introduced into the furnace in the reducing zone.

Burners 18 are preferably operated so that the amount of oxygen introduced into furnace 20 is greater for burners nearest exhaust outlet 22 in the direction of travel of the pellets. Thus, for FIG. 2 where the pellets are traveling in a counter-clockwise direction burner 18a is preferably operated with a higher ratio of oxygen to fuel than burner 18b which is operated with a higher ratio of oxygen to fuel than burner 18c. In this manner the optimal amount of oxygen is introduced at the location necessary to create the most advantageous condition for the heating or reducing function.

The oxidant used in the present process may be air, substantially pure oxygen or a mixture thereof. Fuels for use in the present invention include, but are not limited to, methane, natural gas, propane or other gaseous fuels.

Overall productivity is measured in terms of the amount of metal produced at a certain purity and is controlled by adjusting the input of fuel and oxygen through the burners. Using the process model proposed by J. A. Lepinski and D.C. Meissner in "Application of the Fastmet Process Based on US Conditions" and published in Skillings Mining Review (1992) the optimal location and operation of the burners can be determined by one skilled in the art.

As can be seen from the simulation results of the improved RHF (Table 1), supplying 20% of the required oxygen in pure form (balance being air) allows an increase throughout of 10%, and reduces the natural gas consumption by 50%. A further investigation using the process model revealed that the maximum energy utilization is achieved when 73% of the burner hot gas is produced and/or injected into the first section of RHF (heat transfer section), and remaining 27% is injected into the reactor section (heat transfer and reactions section). This analysis also showed that by controlling O2 distribution strategically, spikes in the temperature gradients in RHF (that are detrimental to the refractory) can be reduced. The amount of heat loss was assumed to be proportional to the DRI throughput.

TABLE 1

Performance of Conventional vs. Improved RHF

| | | Conventional RHF | Improved RHF |
|---|---|---|---|
| Feed | Ore, kg/hr | 1350 kg | 1485 kg |
| | Coal, kg/hr | 420 kg | 462 kg |
| Burner | Air, Nm3/hr | 2830 | 2264 |
| | Pure O2 Nm3/hr | 0 | 119 |
| | Natural Gas, Nm3/hr | 72 | 36 |
| DRI | Amount, ton/hour | 1.015 | 1.121 |
| | Composition | 93% Fe, 1.6% C | 92% Fe, 2.4% C |
| | Temperature | 1335 C | 1321 C |
| Flue | CO | 3.55% | 1.5% |
| Gas | H2 | 0.12% | 0.02% |
| Overall | Oxygen Enrichment | 0 | 20% |
| | Fuel per ton of DRI | 70.94 Nm3 | 32.114 Nm3 |

While the present invention has been described with reference to a preferred embodiment, as will occur to those skilled in the art, numerous additions, omissions and changes may be made without departing from the spirit and scope of the present invention.

We claim:

1. A rotary hearth furnace having a heating zone and a reducing zone comprising:

a cylindrical chamber into which pellets comprising metal oxide and carbon are introduced;

a belt for transporting said pellets radially around the axis of said chamber in a first direction;

a plurality of oxy-fuel burners capable of introducing a mixture of fuel and oxidant into said furnace wherein said mixture travels radially in the direction opposite to said first direction; and one or more oxygen injectors for injecting oxygen or a mixture of oxygen and air into said heating zone and said reducing zone, wherein said plurality of oxy-fuel burners and said one or more oxygen injectors are placed such that a substantial majority of the fuel will be introduced into said reducing zone in a ratio of oxygen to fuel between approximately 1:1 and 1.8:1 thereby providing a fuel-rich atmosphere therein, the remaining fuel being introduced in said heating zone in a ratio between approximately 2:1 and 5:1 thereby providing a fuel lean atmosphere therein.

2. A furnace in accordance with claim 1 wherein, in operation, less than about 30% of the total fuel necessary per ton of metal produced therein from said metal oxide is introduced into said heating zone.

3. A furnace in accordance with claim 2 wherein, in operation, less than about 25% of the total fuel necessary per ton of metal produced therein from said metal oxide is introduced into said heating zone.

4. A furnace in accordance with claim 1, wherein said plurality of oxy-fuel burners and said one or more oxygen injectors are placed such that an increasing amount of fuel and a decreasing amount of oxygen are introduced into the furnace through burners farther from the exhaust outlet of said furnace in the direction of travel of said pellets.

5. The furnace in accordance with claim 1, wherein said oxy-fuel burners are flat-flame burners.

6. A method of reducing metal oxide to produce a metal therefrom in a rotary hearth furnace having a belt moving in a first direction around the axis of said furnace, the method comprising the steps of:

introducing pellets comprising metal oxide and carbon into said furnace on said belt;

identifying a heating zone and a reducing zone within said furnace, including identifying the approximate location in the furnace where a temperature is reached such that reduction of the metal oxide begins;

providing in said furnace a plurality of oxy-fuel burners capable of introducing a mixture of fuel and oxidant into said furnace, said mixture moving radially in the direction opposite to said first direction and one or more oxygen injectors for injecting oxygen or a mixture of oxygen and air into said furnace;

placing said plurality of oxy-fuel burners and said one or more oxygen injectors in said furnace such that a substantial majority of the fuel will be introduced into said reducing zone in a ratio of oxygen to fuel between approximately 1:1 and 1.8:1 thereby providing a fuel-rich atmosphere therein, the remaining fuel being introduced in said heating zone in a ratio between approximately 2:1 and 5:1 thereby providing a fuel lean atmosphere therein; and controlling the introduction of fuel and oxygen into the furnace during operation so that less than about 30% of the total fuel necessary per ton of metal produced therein is introduced in said heating zone.

7. The method in accordance with claim 6, wherein said oxy-fuel burners are flat-flame burners.

8. The method in accordance with claim 6, wherein said oxy-fuel burners are placed around at least one of the inner circumference and outer circumference of said furnace such that said oxy-fuel burners nearest the introduction of said pellets in said first direction introduce more oxidant and less fuel than said oxy-fuel burners located further in said first direction from the introduction of said pellets.

9. A rotary hearth furnace having a heating zone and a reducing zone comprising:

a cylindrical chamber into which pellets comprising metal oxide and carbon are introduced;

a belt for transporting said pellets radially around the axis of said chamber in a first direction;

a plurality of oxy-fuel burners capable of introducing a mixture of fuel and oxidant into said furnace wherein said mixture travels radially in the direction opposite to said first direction; and one or more oxygen injectors for injecting oxygen or a mixture of oxygen and air into said heating zone and said reducing zone, said plurality of oxy-fuel burners and said one or more oxygen injectors placed such that a substantial majority of the fuel will be introduced into said reducing zone thereby providing a fuel-rich atmosphere therein with the remainder being introduced in said heating zone thereby providing a fuel lean atmosphere;

wherein said plurality of oxy-fuel burners and said one or more oxygen injectors are placed such that an increasing amount of fuel and a decreasing amount of oxygen are introduced into the furnace through burners farther from the exhaust outlet of said furnace in the direction of travel of said pellets.

10. A furnace in accordance with claim 9 wherein, in operation, less than about 30% of the total fuel necessary per ton of metal produced therein from said metal oxide is introduced into said heating zone.

11. A furnace in accordance with claim 10 wherein, in operation, less than about 25% of the total fuel necessary per ton of metal produced therein from said metal oxide is introduced into said heating zone.

12. A furnace in accordance wit claim 9 wherein, in operation, the ratio of oxygen to fuel introduced into the reducing zone is between approximately 1:1 and 1.8:1 and said ratio introduced into the heating zone is between approximately 2:1 and 5.1.

13. A furnace in accordance with claim 9, wherein said oxy-fuel burners are flat flame burners.

14. A method of reducing metal oxide to produce a metal therefrom in a rotary hearth furnace having a belt moving in a first direction around the axis of said furnace, the method comprising the steps of:

introducing pellets comprising metal oxide and carbon into said furnace on said belt;

identifying a heating zone and a reducing zone within said furnace, including identifying the approximate location in the furnace where a temperature is reached such that reduction of the metal oxide begins;

providing in said furnace a plurality of oxy-fuel burners capable of introducing a mixture of fuel and oxidant into said furnace, said mixture moving radially in the direction opposite to said first direction and one or more oxygen injectors for injecting oxygen or a mixture of oxygen and air into said furnace;

placing said plurality of oxy-fuel burners and said one or more oxygen injectors in said furnace such that said oxy-fuel burners are placed around at least one of the inner circumference and outer circumference of said furnace for said oxy-fuel burners nearest the introduction of said pellets in said first direction to introduce more oxidant and less fuel than said oxy-fuel burners located further in said first direction from the introduction of said pellets, wherein a substantial majority of the fuel will be introduced into said reducing zone thereby providing a fuel-rich atmosphere therein with fuel remaining being introduced in said heating zone thereby providing a fuel lean atmosphere therein; and controlling the introduction of fuel and oxygen into the furnace during operation so that less than about 30% of the total fuel necessary per ton of metal produced therein is introduced in said heating zone.

15. A method in accordance with claim 14, wherein the introduction of fuel and oxygen into said furnace is controlled during operation such that the ratio of oxygen to fuel introduced in the reducing zone is between approximately 1:1 and 1.8:1 and said ratio in the heating zone is between approximately 2:1 and 5:1.

16. The method in accordance with claim 14, wherein said oxy-fuel burners are flat-flame burners.

* * * * *